United States Patent
Ray (10) Patent No.: US 9,494,761 B2
(45) Date of Patent: Nov. 15, 2016

(54) BRACKET FOR SECURING MULTIPLE FIBER OPTIC CABLES TO A TERMINATION BOX

(71) Applicant: All Systems Broadband, Inc., Livermore, CA (US)

(72) Inventor: Craig Dwayne Ray, Fuquay-Varina, NC (US)

(73) Assignee: All Systems Broadband, Inc., Livermore, CA (US)

( * ) Notice: Subject to any disclaimer, the term of this patent is extended or adjusted under 35 U.S.C. 154(b) by 212 days.

(21) Appl. No.: 14/448,232

(22) Filed: Jul. 31, 2014

(65) Prior Publication Data

US 2016/0033722 A1    Feb. 4, 2016

(51) Int. Cl.
G02B 6/44    (2006.01)

(52) U.S. Cl.
CPC .......... *G02B 6/4471* (2013.01); *G02B 6/4446* (2013.01)

(58) Field of Classification Search
CPC ............... G02B 6/3616; G02B 6/4446; G02B 6/4471
See application file for complete search history.

(56) References Cited

U.S. PATENT DOCUMENTS

| | | | |
|---|---|---|---|
| 5,511,144 A | 4/1996 | Hawkins et al. | |
| 5,929,381 A | 7/1999 | Daoud | |
| 6,009,223 A * | 12/1999 | Arizpe | G02B 6/4452 385/134 |
| 6,385,381 B1 * | 5/2002 | Janus | G02B 6/4441 385/135 |
| 6,412,733 B1 * | 7/2002 | Grzemski | H02G 3/0437 248/218.4 |
| 6,648,280 B1 * | 11/2003 | Chong | A47B 21/06 24/115 R |
| 7,049,515 B1 * | 5/2006 | Collins | H02G 3/083 16/2.1 |
| 8,020,811 B2 | 9/2011 | Nelson | |
| 8,135,256 B2 | 3/2012 | Solheid et al. | |
| 8,331,754 B2 | 12/2012 | Cote et al. | |

(Continued)

OTHER PUBLICATIONS

Ray, Craig Dwayne, "Grommet for Fiber Optic Enclosures", U.S. Appl. No. 14/144,656, filed Dec. 31, 2013.

*Primary Examiner* — Daniel Petkovsek
(74) *Attorney, Agent, or Firm* — Murphy, Bilak & Homiller, PLLC (57) ABSTRACT

A bracket for mounting multiple fiber optic cables to a termination box includes a first substantially planar portion having one or more fastener perforations, a second substantially planar portion forming a first corner with the first substantially planar portion, and a third substantially planar portion forming a second corner with the second substantially planar portion, a protrusion of the first and second planar portions at the first corner, and a notch in the second planar portion between the first and second corners. The bracket includes a first tether attachment point having first and second recessed edges of the first and second planar portions and a second tether attachment point having a third recessed edge in the notch and a fourth recessed edge of the third planar portion. The first and second tether attachment points are configured to receive first and second tethers wrapped around the first and second corners, respectively.

15 Claims, 7 Drawing Sheets

(56) References Cited

U.S. PATENT DOCUMENTS

| | | | |
|---|---|---|---|
| 8,364,000 B2 | 1/2013 | Gonzalez et al. | |
| 8,448,923 B1 * | 5/2013 | Schad | E04G 21/3242 |
| | | | 256/59 |
| 8,979,389 B2 * | 3/2015 | Ray | G02B 6/4429 |
| | | | 385/135 |
| 9,291,786 B2 * | 3/2016 | Ray | G02B 6/4444 |
| 2005/0077437 A1 * | 4/2005 | Widlacki | F16L 57/00 |
| | | | 248/70 |
| 2012/0223192 A1 | 9/2012 | Donaldson et al. | |
| 2013/0233612 A1 | 9/2013 | Pimentel | |

* cited by examiner

BRACKET FOR SECURING MULTIPLE FIBER OPTIC CABLES TO A TERMINATION BOX

TECHNICAL FIELD

The present invention generally relates to optical communications equipment, and particularly relates to devices for securely affixing a plurality of fiber optic cables to a single location within a termination box.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth and lower losses. Fiber optic cables typically include a plurality of individual optical fibers and a durable exterior jacket that surrounds and protects the optical fibers.

Fiber optic networks include termination boxes for storing a splice of fiber optic cabling, such as a splice between service provider cabling and customer cabling. A fiber optic termination box provides an enclosed space to secure the spliced optical fibers, which are exposed from the exterior cable jacket and are vulnerable to damage. Furthermore, fiber optic termination boxes provide a working space for an installer to effectuate the splice and secure any excess cabling.

Industry convention requires that installations of fiber optic splices in termination boxes be able to withstand a substantial amount of force applied to the cabling from outside the termination box. For example, one industry convention involves a pull-test in which the fiber optic cabling is subjected to a pulling force so as to simulate forces exerted on the cabling attributable to field conditions, such as thermal expansion and line work. Under the pull-test, 100 lbs. of force is applied to the cabling. The installation passes the test if the splice remains intact after this pulling force.

These industry conventions may be particularly difficult to satisfy in the event that multiple fiber optic cables are spliced in a single termination box. This configuration has become more desirable due to the increased need for bandwidth and network capacity. In these multi-cable configurations, the interplay between the individual cables and the inability to secure both cables to the strongest mounting location increases the likelihood of failing a pull-test.

SUMMARY

A bracket for mounting multiple fiber optic cables to a fiber optic termination box is disclosed. In one embodiment, the bracket includes a first substantially planar portion having one or more fastener perforations dimensioned to receive a fastener for affixing the bracket to the fiber optic termination box, a second substantially planar portion forming a first corner with the first substantially planar portion, and a third substantially planar portion forming a second corner with the second substantially planar portion, the third planar portion being spaced apart from the first substantially planar portion. The bracket further includes a protrusion of the first and second planar portions at the first corner and a notch in the second planar portion between the first and second corners. The bracket further includes a first tether attachment point having first and second recessed edges of the first and second planar portions, respectively, the first and second recessed edges each being spaced apart from the first corner along the protrusion and together being configured to receive a first tether wrapped around the first corner so as to secure a first fiber optic cable to the bracket. The bracket further includes a second tether attachment point having a third recessed edge in the notch and a fourth recessed edge of the third planar portion, the third and fourth recessed edges each being spaced apart from the second corner and together being configured to receive a second tether wrapped around the second corner so as to secure a second fiber optic cable to the bracket.

In another embodiment, a bracket for mounting multiple fiber optic cables to a fiber optic termination box includes a first substantially planar portion having at least three fastener perforations dimensioned to receive a fastener for affixing the bracket to the fiber optic termination box, the fastener perforations forming a polygon having an interior region between the fastener perforations. The bracket further includes a second substantially planar portion adjoining and extending away from the first planar surface, and a third substantially planar portion adjoining and extending away from the second planar so as to extend directly over the interior region of the polygon. The bracket further includes a protrusion of the first and second planar sections, the protrusion being outside of and extending away from the interior region in a direction parallel to the first and second planar sections, and a notch in the second planar section extending in a direction parallel to the protrusion. The bracket further includes a first tether attachment point having recessed edges of the first and second planar portions along the protrusion. The bracket further includes a second tether attachment point having a recessed edge in the notch and a recessed edge of the third planar section. The recessed edges of each of the first and second tether attachment points are configured to receive a corresponding tether so as to secure a first fiber optic cable to the first tether attachment point and a second fiber optic cable to the second tether attachment point.

An assembly for securing one or more fiber optic cables to a fiber optic termination box is also disclosed. In one embodiment, the assembly includes a multi-cable retention bracket. The multi-cable retention bracket includes a first substantially planar portion having one or more fastener perforations dimensioned to receive a fastener for affixing the bracket to the fiber optic termination box, a second substantially planar portion forming a first corner with the first substantially planar portion, and a third substantially planar portion forming a second corner with the second substantially planar portion, the third planar portion being spaced apart from the first substantially planar portion. The multi-cable retention bracket further includes a protrusion of the first and second planar portions at the first corner, and a notch in the second planar portion between the first and second corners. The multi-cable retention bracket further includes a first tether attachment point having first and second recessed edges of the first and second planar portions, respectively, the first and second recessed edges each being spaced apart from the first corner along the protrusion and together being configured to receive a first tether wrapped around the first corner so as to secure a first fiber optic cable to the bracket. The multi-cable retention bracket further includes a second tether attachment point having a third recessed edge in the notch and a fourth recessed edge of the third planar portion, the third and fourth recessed edges each being spaced apart from the second corner and together being configured to receive a second tether wrapped around the second corner so as to secure a second fiber optic cable to the bracket. The assembly further includes first and second fiber optic cables secured to the multi-cable retention bracket, wherein the first fiber optic cable is secured to the first tether attachment point by a first tether arranged in the first and second recessed edges and wrapped around the first corner, and wherein the second fiber optic cable is secured to the second tether attachment point by a second tether arranged in third and fourth recessed edges and wrapped around the second corner.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 including

FIGS. 3A-3B illustrates a fiber optic termination box having a mounting location for a bracket, according to an embodiment.

DETAILED DESCRIPTION

Embodiments described herein provide a bracket for mounting multiple fiber optic cables to a fiber optic termination box in a durable, pull-resistant configuration. According to an embodiment, the bracket is configured to secure two fiber optic cables to a fiber optic termination box. The bracket includes a planar mounting portion having one or more fastener perforations. The planar mounting portion may be placed squarely on a corresponding planar surface in the termination box and secured to the termination box by fasteners (e.g., screws). According to an embodiment, the planar mounting portion includes three fastener perforations in a triangle configuration. This configuration provides a connection between the bracket and termination box that is resistant to pulling forces exerted upon the cabling by minimizing the leverage that may be exerted over the fasteners.

The bracket includes two tether attachment points that are arranged so as to improve the strength of the bracket in response to pulling of fiber optic cabling that is tethered to the bracket. In particular, a first tether attachment point is formed along the planar mounting portion of the bracket outside of the interior space of the fastener perforations (e.g., outside a triangle formed by three fastener perforations). As a result, force exerted upon the first tether attachment point is directly transmitted along a mounting plane of the bracket and does not traverse any weaker points in the bracket. A second tether attachment point is spaced apart from the mounting plane, but extends over the interior space of the fastener perforations (e.g., over a triangle). As a result, the leverage that the second tether attachment point has over the fastener perforations is reduced, as the distance between the second tether attachment and the fasteners is reduced. Additionally, this configuration allows the two tether attachment points to be offset from one another in a vertical direction so that, after one cable is secured to one tether attachment point, the second tether attachment point remains easily accessible to an installer.

Figure 1A:
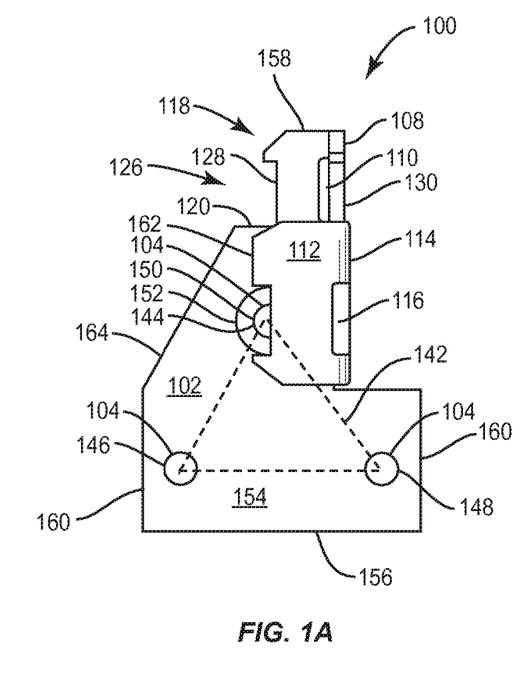
FIGS. 1A-1C illustrates a bracket for mounting multiple fiber optic cables to a fiber optic termination box, according to an embodiment.
Figure 1B:
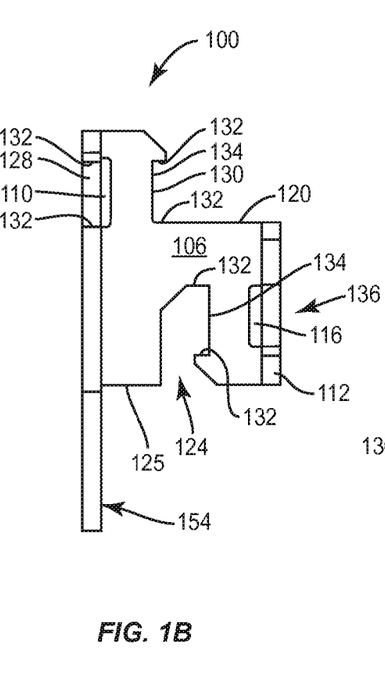
Figure 1C:
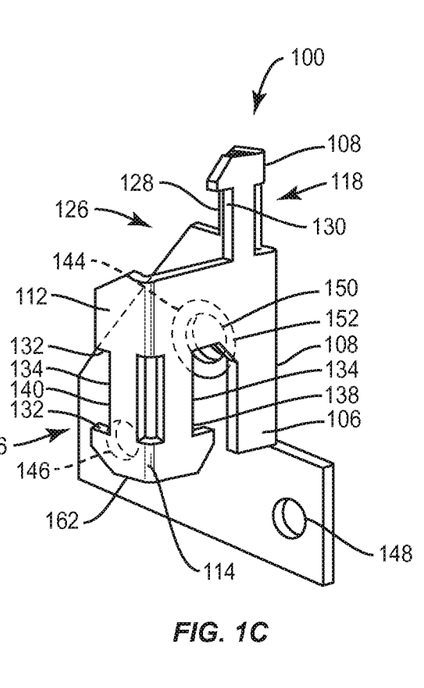

Referring to FIG. 1, a bracket 100 is depicted. FIG. 1A depicts the bracket 100 from a front-view perspective, FIG. 1B depicts the bracket 100 from a side-view perspective, and FIG. 1C depicts the bracket 100 from a diagonal-view perspective. The bracket includes a first substantially planar portion 102. The first planar portion 102 includes one or more fastener perforations 104. The fastener perforations 104 may be circular perforations that are dimensioned to receive a fastener, such as a screw. The fastener perforations 104 allow the bracket 100 to be secured to another article by placing first planar portion 102 flush on a corresponding planar surface and tightening fasteners in the fastener perforations 104 in a commonly known manner.

The bracket 100 additionally includes a second planar portion 106 forming a first corner 108 with the first planar portion 102. That is, the second planar portion 106 extends along a different plane than the first planar portion 102 and adjoins the first planar portion 102. According to an embodiment, the second planar portion 106 is perpendicular to the first planar portion 102. Alternatively, the second planar portion 106 may be inclined with respect to the first planar portion 102 so as to form an angle of greater or less than ninety degrees. The second planar portion 106 adjoins the first planar portion 102 in at least one region. However, the second planar portion 106 does not necessarily form a continuous intersection with the first planar portion 102. As shown in FIG. 1, there may be an opening 110 along the first corner 108.

The bracket 100 additionally includes a third planar 112 portion forming a second corner 114 with the second planar portion 106. The third planar portion 112 adjoins the second planar portion 106 in at least one region. However, the third planar portion 112 does not necessarily form a continuous intersection with the second planar portion 106. As shown in FIG. 1, there may be an opening 116 along the second corner 114. The third planar portion 112 is spaced apart from the first planar portion 102. According to an embodiment, the third planar portion 112 is parallel to the first planar portion 102 and is perpendicular to the second planar portion 106. Alternatively, the third planar portion 112 may be inclined with respect to the second planar portion 106 so as to form an angle of greater or less than ninety degrees. The first, second and third planar portions 102, 106, 112 may collectively form u-shaped cable receptacle having two ninety-degree angles between sidewalls and a bottom of the receptacle.

The bracket 100 additionally includes a protrusion 118 of the first and second planar portions 102, 106 at the first corner 108. The protrusion 118 may be formed from sections of the first and second planar portions 102, 106 that extend away from a top edge 120 of the bracket. The top edge 120 is an edge of the first planar portion 102 and the second planar portion 106 that is adjacent and extends perpendicular to the protrusion 118.

The bracket 100 additionally includes a notch 124 in the second planar portion 106 between the first and second corners 108, 114. The notch 124 may be formed in an edge 125 of the second planar portion 106 that is opposite the top edge 120. The notch 124 extends into an interior area of the second planar portion 106. According to an embodiment, the notch 124 extends into the second planar portion 106 in a direction parallel to the protrusion 118.

The bracket 100 additionally includes a first tether attachment point 126. The first tether attachment point 126 includes first and second recessed edges 128, 130 of the first and second planar portions 102, 106. The first and second recessed edges 128, 130 are arranged along the protrusion 118. More particularly, the first recessed edge 128 is formed along an edge of the first planar surface 102 that extends away from the top edge 120 and the recessed edge 130 is formed along an edge of the second planar surface 106 that extends away from the top edge 120. The first and second recessed edges 128, 130 are spaced apart from the first corner 108.

The first and second recessed edges 128, 130 are configured to receive a tether wrapped around the first corner 108 so as to secure a first fiber optic cable to the bracket 100. That is, the first and second recessed edges 128, 130 are sufficiently spaced apart from the first corner 108 such that a tether, such as a hose clamp, may be securely tightened within the first and second recessed edges 128, 130 with a fiber optic cable retained against the bracket 100 by the tether. The first and second recessed edges 128, 130 include two sidewalls 132 spaced apart by a bottom section 134. According to an embodiment, the two sidewalls 132 are perpendicular to the bottom section 134. Alternatively, the two sidewalls 132 may be angled with respect to the bottom section 134 such that both of the sidewalls 132 form a burr (i.e., form an angle less than ninety degrees with the bottom section 134).

The bracket 100 additionally includes a second tether attachment point 136 formed from portions of the second and third planar portions 106, 112 around the second corner 114. The second tether attachment point 136 includes a third recessed edge 138 in the notch 124 and a fourth recessed edge 140 of the third planar portion 112. The third and fourth recessed edges 138, 140 are spaced away from the second corner 116. According to an embodiment, the third and fourth recessed edges 138, 140 are spaced apart from the second corner 116 by the same distance that the first and second recessed edges 128, 130 are spaced apart from the first corner 108. The third and fourth recessed edges 138, 140 are configured to receive a tether wrapped around the second corner 116 so as to secure a second fiber optic cable to the bracket 100 in a similar manner as described above with reference to the first and second recessed edges 128, 130 and the first fiber optic cable.

Figure 2:
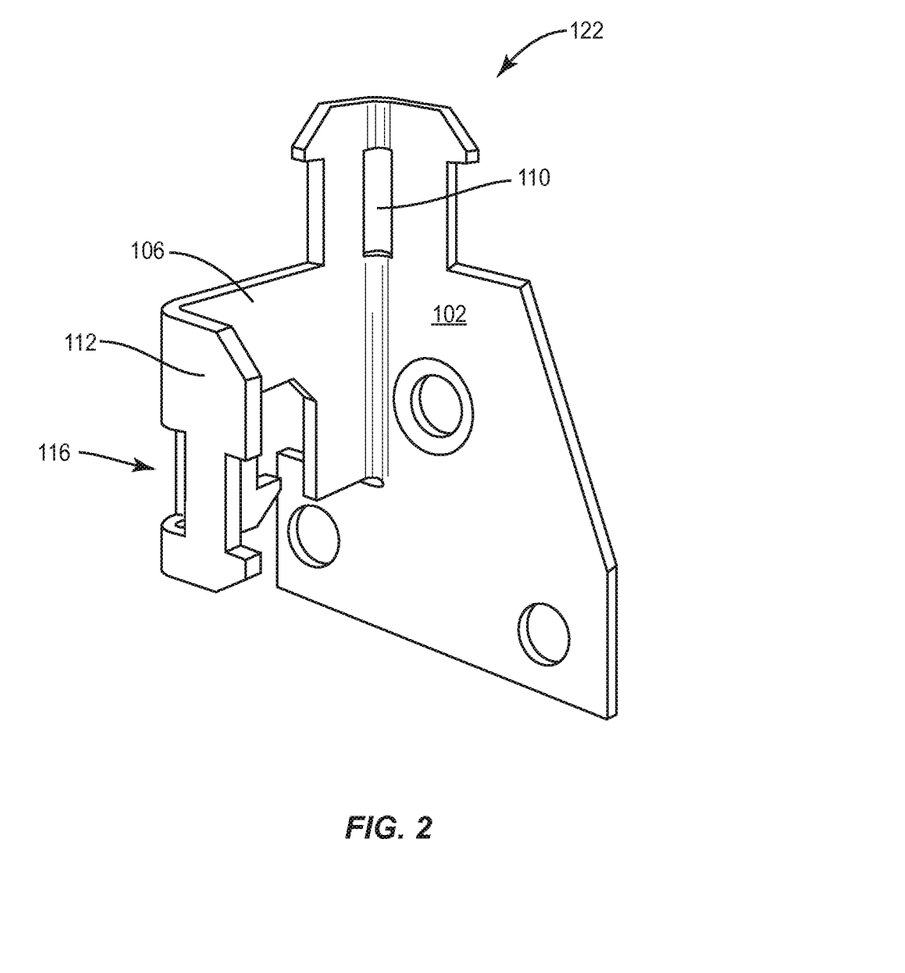
FIG. 2 illustrates a bracket for mounting multiple fiber optic cables to a fiber optic termination box, according to another embodiment FIG. 3 including

FIG. 2 depicts a bracket 122 that is substantially identical to the bracket 100 depicted in FIG. 1, except that the orientation of the second and third planar portions 106, 112 relative to the first planar portion 102 is reversed. That is, the bracket of FIG. 2 is configured so that the u-shaped receptacle formed by the first, second and third planar portions 102, 104, 106 faces in an opposite direction as u-shaped receptacle in the bracket 100 of FIG. 1. The different configurations for the two brackets 100, 122 provide options for an installer to fit the brackets 100, 122 in a fiber optic termination box with other items (e.g., fiber optic cabling) in a space-efficient manner.

Figures 3, 3B:
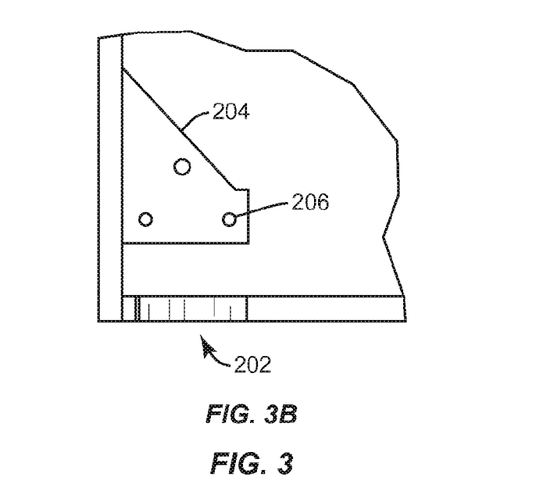

FIG. 3 depicts an exemplary fiber optic termination box 200. The fiber optic termination box 200 may be any enclosure that is used to contain splices of fiber optic cabling. The fiber optic termination box 200 includes an entry point 202 for the insertion of fiber optic cabling. The fiber optic termination box 200 additionally includes a bracket mounting location 204. The bracket mounting location 204 is a planar surface that includes fastener perforations 206 dimensioned and arranged in a corresponding manner as the fastener perforations 104 of the bracket 100. The bracket mounting location 204 is spaced close to the entry point 202. This arrangement ensures that forces exerted upon the fiber optic cabling will be distributed directly to the mounting location 204 by one of the brackets 100, 122. Thus, the forces exerted upon the fiber optic cabling are decoupled from the splice, which is not typically able to withstand significant pulling forces.

Figure 4:
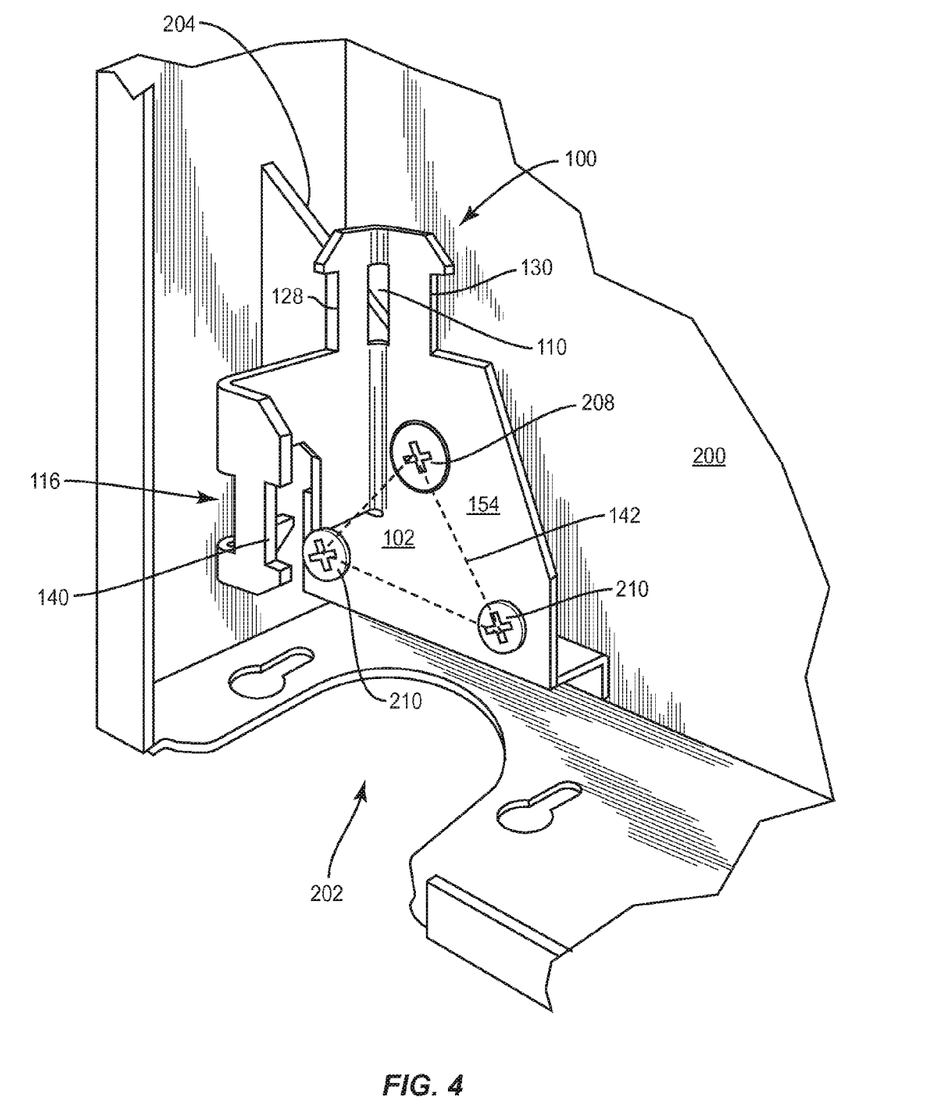
FIG. 4 illustrates the bracket of FIG. 1 secured to a fiber optic termination box, according to an embodiment.
Figure 5:
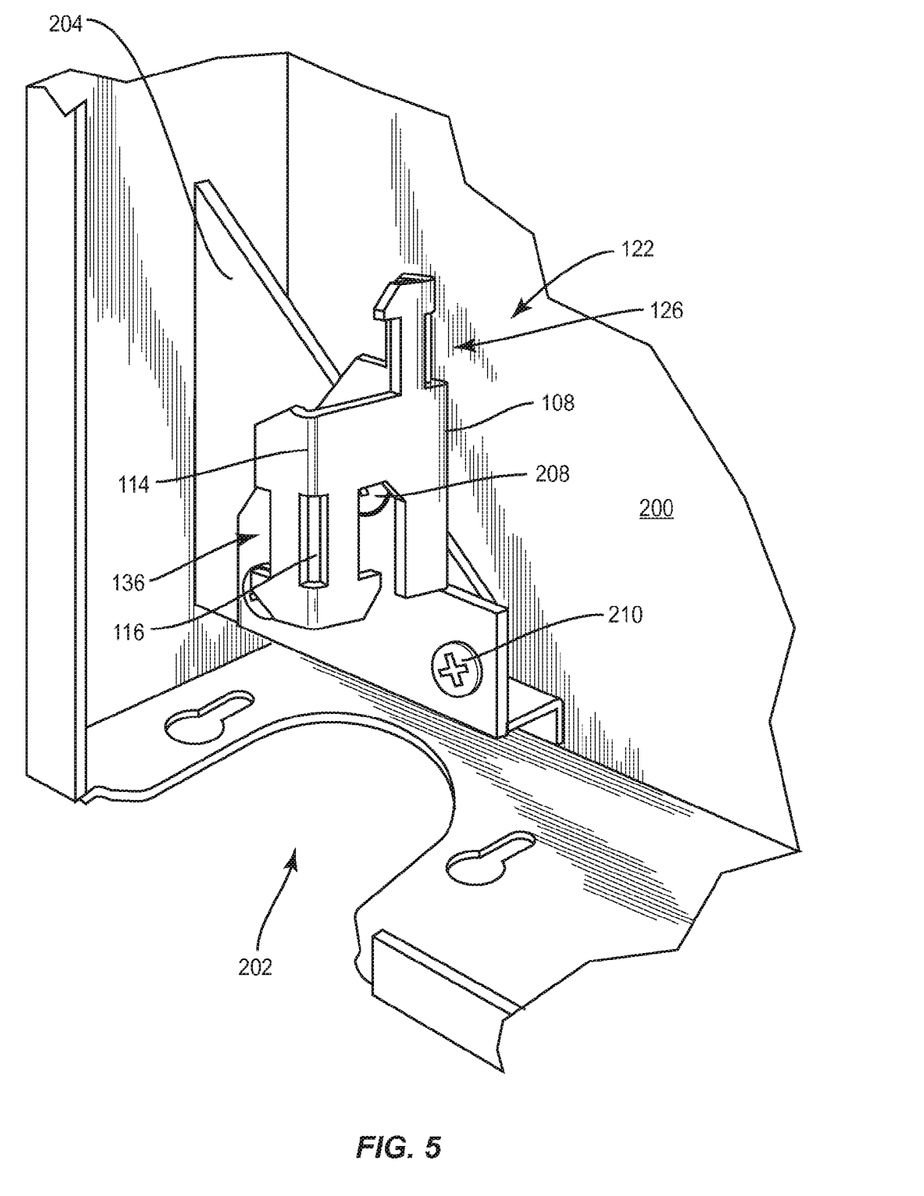
FIG. 5 illustrates the bracket of FIG. 2 secured to a fiber optic termination box, according to an embodiment.

FIG. 4 depicts the bracket 100 of FIG. 1 secured to the fiber optic termination box 200. The bracket 100 is secured to the fiber optic termination box 200 by placing the first planar portion 102 flush with the mounting location 204 and tightening fasteners 208, 210 (e.g., screws) in the fastener perforations 206, 104 in a commonly known manner. Thus, the first planar portion 102 of the bracket 100 forms a mounting plane such that forces applied to the bracket 100 (e.g., by fiber optic cabling tethered to the first and second tether attachment points 126, 136) are distributed along the mounting plane to the fasteners 208, 210.

According to an embodiment, the first planar portion has 102 a plurality of fastener perforations 104 arranged in a polygon. That is, the fastener perforations 104 have a two-dimensional interior region 142 between them and thus do not form a straight line. For example, the first planar portion 102 may include three fastener perforations 104 arranged in a triangle. In this triangular configuration, a first fastener perforation 144 (depicted in FIG. 1) is spaced closer to the first tether attachment point 126 than second and third fastener perforations 146, 148 (depicted in FIG. 1). This arrangement provides a strong connection between the bracket 100 and the mounting location 204 that is resistant to pulling from the cable because there is very little mechanical advantage (i.e., leverage) between the first and second tether attachment points 126, 136 and the fasteners 208, 210.

Alternatively, the first planar portion 102 may include more than three fastener perforations 104 arranged in a variety of shapes, such as a rectangle, pentagon, hexagon, etc. Ideally, the fastener perforations 104 are each spaced close to the perimeter of the first planar portion 102 such that the interior region 142 occupies a substantial majority of the first planar portion 102. This reduces the leverage of the outer portions of the bracket 100 over the fasteners 208, 210 and consequently makes the bracket 100 more resistant to pulling forces.

The first and second tether attachment points 126, 136 are advantageously arranged so as to minimize their mechanical leverage over the fasteners 208, 210. This minimized leverage results in a bracket 100 that will not deform and/or fail under substantial forces (e.g., 100 lbs. or more) exerted by fiber optic cabling tethered to the attachment points 126, 136.

The mechanical advantage (i.e., leverage) of a cable secured to the first tether attachment point 126 is minimized because the first tether attachment point 126 is arranged along the mounting plane of the bracket 100. This reduces the mechanical advantage because the distance between a tether secured to the first tether attachment point 126 and the fasteners 208, 210 is minimized. Furthermore, because the first tether attachment point 126 is on the same plane as the fasteners 208, 210, the force transmitted between the cable and the fasteners 208, 210 is not distributed over any corners or regions in the bracket 100 that are more susceptible to bending. By contrast, if the first tether attachment point 126 was located on a plane different than the mounting plane (e.g., along the second or third planar portions 106, 112), this pulling force would be distributed over a greater distance and would be transmitted through corners of the bracket, which may cause the bracket to deform and/or fail under substantial forces (e.g., 100 lbs. or more) exerted by fiber optic cabling.

The mechanical advantage (i.e., leverage) of a cable secured to the second tether attachment point 136 is minimized because the second tether attachment point 136 is arranged over the two-dimensional shape formed by the fastener perforations 108. According to an embodiment, the third planar portion 112 extends over the first planar portion 102 such that the second tether attachment point 136 point overlaps with the interior region 142 of the fastener perforations in a direction perpendicular to the first planar portion 102. This minimizes the mechanical advantage because the distance between the second tether attachment point 136 and the fasteners 204 is reduced.

According to an embodiment, the fourth recessed edge 140 of the second tether attachment point 136 overlaps with the first fastener perforation 144 in the direction perpendicular to the first planar portion 102. This vertical overlap is depicted in FIG. 1A. This arrangement advantageously provides more freedom of movement for an installer to easily secure a fastener 208 in the first fastener perforation 144 because the first fastener perforation 144 is partially exposed by the fourth recessed edge 140. That is, the fourth recessed edge 140 provides additional leeway for a screwdriver to be oriented perpendicular or near perpendicular to the mounting plane formed by the first planar portion 102.

According to an embodiment, the first fastener perforation 144 includes a beveled edge at a surface of the first planar portion 102. For example, the first fastener perforation 144 may include an inner and outer ring 150, 152 and a section between the inner and outer ring 150, 152 that is inclined (i.e. non-perpendicular) with respect to a planar surface 154 of the first portion 102. This configuration allows a fastener 208 with a tapered inner face (e.g., a flat-head screw) to be inserted in the first fastener perforation 144 and tightened such that a top side of the fastener 208 (e.g., a head of the screw) is beneath the planar surface 154 of the first portion 102. Advantageously, this arrangement prevents the fastener 208 from protruding out from the planar surface 154 and consequently damaging cabling that is secured to the bracket 100 and is pulled against the planar surface 154. By contrast, the fasteners 210 inserted in the second and third fastener perforations 146, 148 may be pan-head screws that protrude out from the planar surface 154 when completely tightened. These fasteners 210 do not damage cabling that is secured to the bracket 100 because the cabling can be arranged between against the planar surface 154.

The openings 110, 116 at the first and second corners 108, 114 provide flexibility in regards to the diameter of fiber optic cabling that may be tethered to the bracket 100. The openings are sized in a similar manner as the recessed edges 128, 130, 138, 140 so as to engage a tether. For example, a fiber optic cable having a certain diameter (e.g., 11 millimeters) may be tethered to the first tether attachment 118 point by placing the cable flush against the first and second planar sections 102, 106 near the first corner 108 and placing the tether in both of the first and second recessed edges 128, 130. A fiber optic cable having a lesser diameter (e.g., 4 millimeters) may be tethered to the first tether attachment point 126 using the opening 110, 116 and one of the recessed edges 128, 130. The tether may be inserted through the opening 110 and placed in the first recessed edge 128, for example. The opening 116 in the second tether attachment point 136 may be used in the same manner with respect to the third and fourth recessed edges 138, 140. Furthermore, the openings 110, 116 at the first and second corners 108, 114 are advantageous for the manufacture of the bracket 100. For example, if the bracket 100 is formed by a single sheet of material, the openings 110, 116 can be formed before the first and second corners 108, 114 (e.g., by punching the sheet of material) so as to form a weaker point in the material from which the first, second and third planar portions 102, 106 and 112 can be bent around. As a result, the ability to form the first and second corners 108, 114 at a precise location and along a precise line is improved.

The overall dimensions of the bracket 100, including the dimensions of the first, second and third planar portions 102, 106 and 112, may vary, depending upon factors such as, available space within the fiber optic termination box 200, dimensions of the bracket mounting location 204, and dimensions of the fiber optic cabling.

According to an embodiment, a height of the bracket 100 measured by a minimum distance between a bottom edge 156 of the first planar portion 102 and a top edge 158 of the protrusion 118 is 5.4 centimeters; a height of the first planar portion 102 measured by a minimum distance between the bottom edge 156 and the top edge 120 is 5.4 centimeters; a width of the first planar portion 102 measured by a minimum distance between lower edge sides 160 is 4.0 centimeters; a height of the second planar portion 112 measured by a minimum distance between the edge 125 of the second planar portion 106 that is opposite the top edge 120 and the top edge 120 is 2.2 centimeters; a width of the second planar portion 106 measured by a minimum distance between the first and second corners 108, 114 is 2.5 centimeters; a height of the third planar portion 112 measured by a minimum distance between a bottom edge 162 and the top edge 120 is 2.2 centimeters; and a width of the third planar portion 112 measured by a minimum distance between the second corner 118 and an edge side 162 that is opposite the second corner 118 is 1.0 centimeters. The first planar portion 102 may include at least one angled edge side 164. The angled edge side 164 reduces the overall area consumption of the bracket 100 and reduces the likelihood that fiber optic cabling will get caught on an abrupt corner of the bracket 100.

Figure 6:
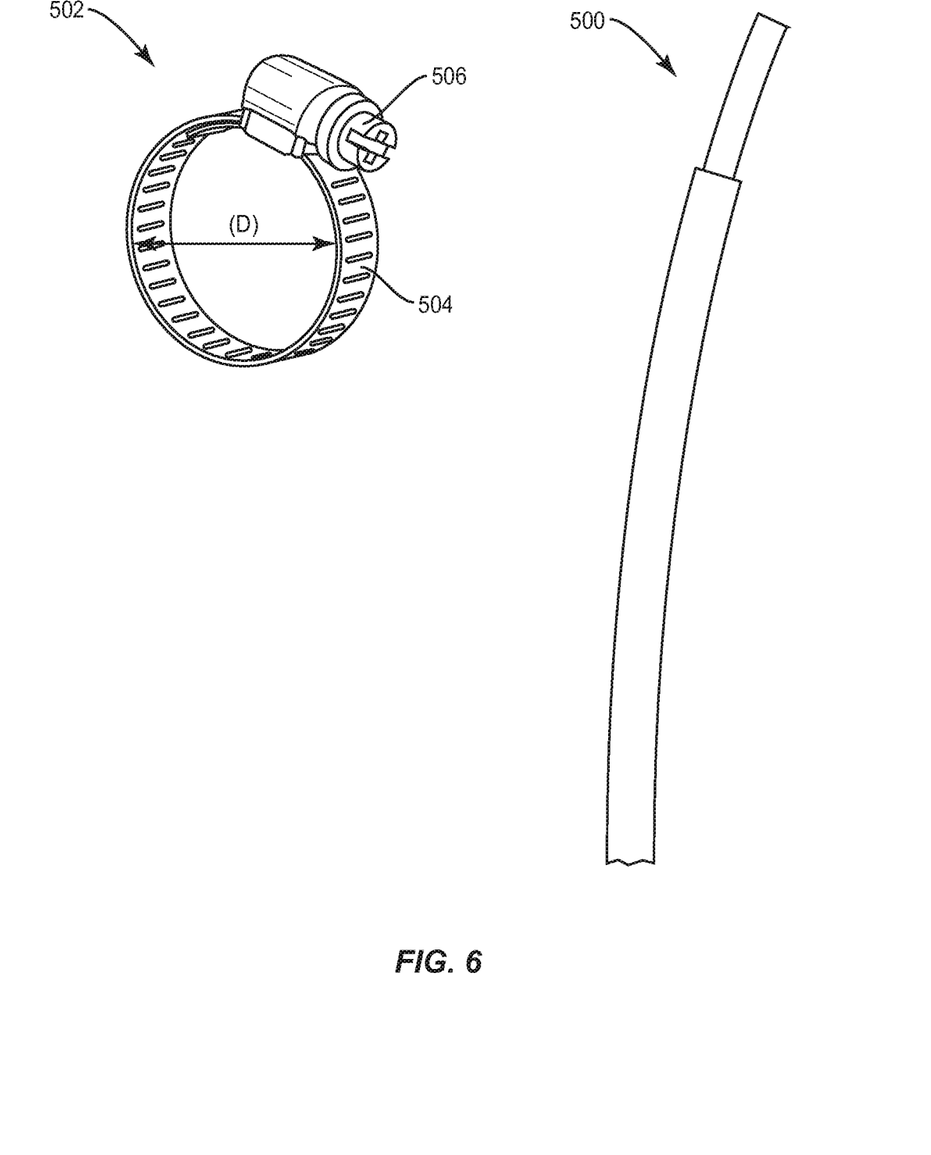
FIG. 6 illustrates a fiber optic cable and tether that may be used to secure the fiber optic cable to a bracket, according to an embodiment.

Referring to FIG. 6, a fiber optic cable 500 and a tether 502 are depicted. The tether 500 may be used to secure the fiber optic cable 500 to the brackets 100, 122 at either of the first and second tether attachment points 126, 136. The fiber optic cable 500 may be 9 millimeters in diameter and may include a relatively durable exterior jacket made of polyethylene. The tether 502 includes a band 504 and a tightening mechanism 506. A diameter (D) of the band 504 is adjusted by the tightening mechanism 506. The fiber optic cable 500 may be secured to another object (e.g., a bracket) by placing the band 504 around the cable 500 and the object and decreasing the diameter (D) of the band 504. The tightening mechanism 506 may be used to maintain the diameter (D) of the band 504 thereafter. According to an embodiment, the tether 500 is a hose clamp and the tightening mechanism 506 is a screw clamp. Alternatively, the tether 500 may be a zip tie.

Figure 7:
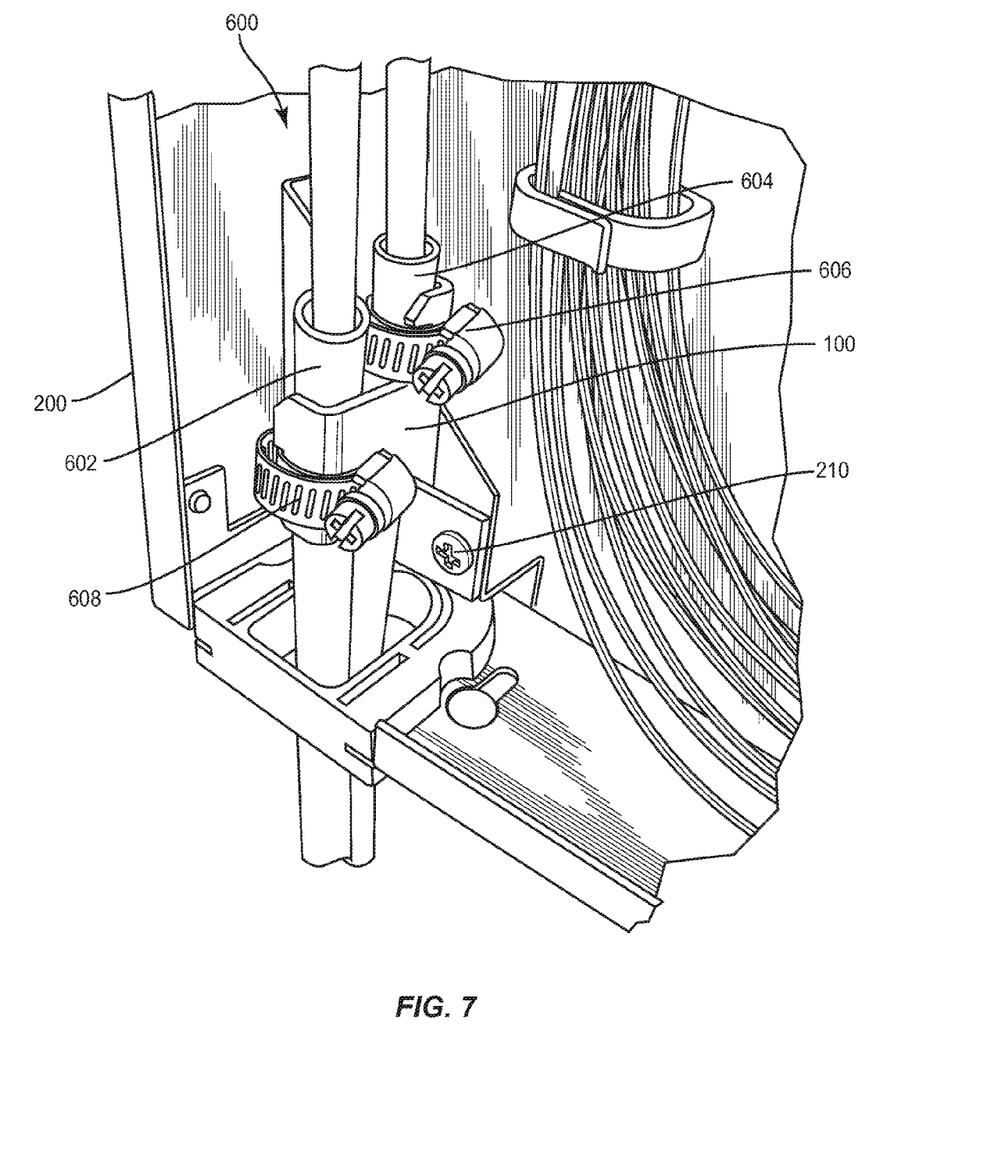
FIG. 7 illustrates an assembly of two fiber optic cables tethered to a bracket that is secured to a fiber optic termination box, according to an embodiment.

Referring to FIG. 7, an assembly 600 including the fiber optic termination box 200, first and second fiber optic cables 602, 604, first and second tethers 606, 608 and a multi-cable retention bracket 100 is depicted. The multi-cable retention bracket 100 is identical to the bracket 100 depicted in FIG. 1. The first and second fiber optic cables 602, 604 and the first and second tethers 606, 608 are identical to the fiber optic cable 500 and tether 502 depicted in FIG. 6.

Figure 3A:
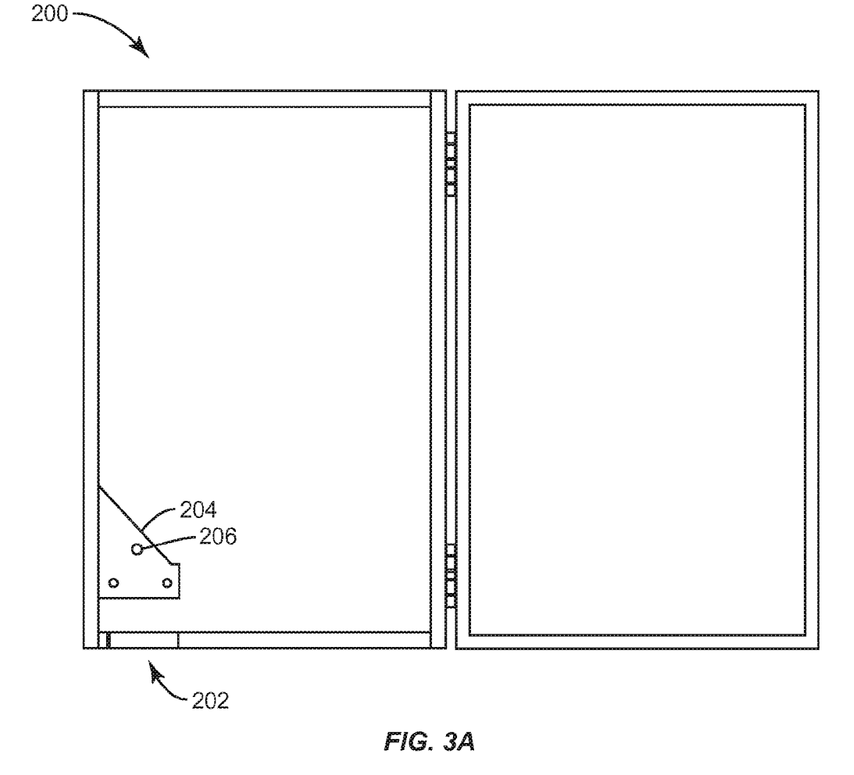

In the assembly 600, the two fiber optic cables 602, 604 are secured to the bracket 100 by the tethers 606, 608. The bracket 100 is secured to the fiber optic termination box 200 with three fasteners 208 in the manner described with reference to FIG. 3A. The first fiber optic cable 602 is secured to the first tether attachment point 126 by the first tether 606 arranged in the first and second recessed edges 128, 130 and wrapped around the first corner 108. The second fiber optic cable 604 is secured to the second tether attachment 136 point by the second tether 608 arranged in third and fourth recessed edges 138, 140 and wrapped around the second corner 118.

The arrangement of the first and second tether attachment points 126, 136 advantageously provides easy access to the tightening mechanisms 506 of the first and second tethers 606, 608. As shown in FIG. 7, the first and second tether attachment points 126, 136 are offset from one another in two directions (i.e., parallel and perpendicular to the first planar portion 102). Thus, an installer has easy access to both tether attachment points 126, 136 and to the tightening mechanisms 506 during the installation of both fiber optic cables 602, 604.

The dimensions of the first and second recessed edges 128, 130 may be tailored to a specific tether. According to an embodiment, a distance between the two sidewalls 132 of the recessed edges 128, 130, 138, 140 corresponds to a thickness of one the tethers 606, 608. A corresponding relationship exists when the two dimensions are sufficiently close to enable a tight fit, but a corresponding relationship does not require the two dimensions to be exactly identical. For example, the first tether 606 embodied as a hose clamp may have a thickness of approximately 0.80 centimeters and a distance between the two sidewalls 132 of the recessed edges 128, 130, 138, 140 may be 0.82 centimeters. This dimensioning allows the first tether 606 to be easily placed in one of the first, second, third and fourth recessed edges 128, 130, 138, 140 and to be substantially restricted in movement thereafter.

The bracket 100 may be made from any material suitable for forming the features discussed herein, such as steel, aluminum, plastic or any other formable material. The material of the bracket 100 ideally has sufficient strength to resist the forces exerted by one or more fiber optic cables, as required per Telecordia Specification GR-771. The shape and contours of the bracket may be punched and then bent into shape by either hand or break.

The planar portions described herein, such as the first, second and third planar portions, 102, 106, 112 may be substantially planar. Substantially planar refers to a portion that is not necessarily perfectly flat, and that instead may slightly deviate from a singular plane. A substantially planar portion may be manufactured to specifications requiring perfectly or near-perfectly flat surfaces. However, process variation and warping due to temperature or installation may result in portions of the bracket 100 that are not perfectly flat. Provided that these portions are sufficiently planar to allow for the retention of fiber optic cabling and to allow for the formation of the features of the bracket described herein (e.g., the first and second tether attachment points 126, 136), these portions are substantially planar portions and encompass the embodiments described herein.

Directional terminology, such as "top," "bottom," "front," "back," "upper," "lower," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A bracket for mounting multiple fiber optic cables to a fiber optic termination box, the bracket comprising:
   a first substantially planar portion comprising one or more fastener perforations dimensioned to receive a fastener for affixing the bracket to the fiber optic termination box;
   a second substantially planar portion forming a first corner with the first substantially planar portion;
   a third substantially planar portion forming a second corner with the second substantially planar portion, the third planar portion being spaced apart from the first substantially planar portion;
   a protrusion of the first and second planar portions at the first corner;
   a notch in the second planar portion between the first and second corners;
   a first tether attachment point comprising first and second recessed edges of the first and second planar portions, respectively, the first and second recessed edges each being spaced apart from the first corner along the protrusion and together being configured to receive a first tether wrapped around the first corner so as to secure a first fiber optic cable to the bracket; and
   a second tether attachment point comprising a third recessed edge in the notch and a fourth recessed edge of the third planar portion, the third and fourth recessed edges each being spaced apart from the second corner and together being configured to receive a second tether wrapped around the second corner so as to secure a second fiber optic cable to the bracket.

2. The bracket of claim 1, wherein the first planar portion comprises at least three fastener perforations arranged in a polygon so as to form an interior region between the fastener perforations, and wherein the third planar portion overlaps with the interior region in a direction perpendicular to the first planar portion.

3. The bracket of claim 2, wherein the first planar portion comprises three fastener perforations, and wherein a first fastener perforation is spaced closer to the first tether attachment point than the second and third fastener perforations.

4. The bracket of claim 3, wherein the fourth recessed edge overlaps with the first fastener perforation in the direction perpendicular to the first planar portion.

5. The bracket of claim 3, wherein the first fastener perforation comprises a beveled edge at a surface of the first planar portion.

6. The bracket of claim the first, second, third and fourth recessed edges each comprise two sidewalls spaced apart by a bottom section, wherein the two sidewalls are perpendicular to the bottom section.

7. The bracket of claim 1, wherein the first tether attachment point further comprises an opening at the first corner, and wherein the second tether attachment point comprises an opening at the second corner, said openings being sized to engage said first and second tethers, respectively.

8. The bracket of claim 1, wherein the first planar portion adjoins and is perpendicular to the second planar portion, and wherein the second planar portion adjoins and is perpendicular to the third planar portion.

9. A bracket for mounting multiple fiber optic cables to a fiber optic termination box, the bracket comprising:
a first substantially planar portion comprising at least three fastener perforations dimensioned to receive a fastener for affixing the bracket to the fiber optic termination box, the fastener perforations forming a polygon having an interior region between the fastener perforations;
a second substantially planar portion adjoining and extending away from the first planar surface;
a third substantially planar portion adjoining and extending away from the second planar so as to extend directly over the interior region of the polygon;
a protrusion of the first and second planar sections, the protrusion being outside of and extending away from the interior region in a direction parallel to the first and second planar sections;
a notch in the second planar section extending in a direction parallel to the protrusion;
a first tether attachment point comprising recessed edges of the first and second planar portions along the protrusion; and
a second tether attachment point comprising a recessed edge in the notch and a recessed edge of the third planar section;
wherein the recessed edges of each of the first and second tether attachment points are configured to receive a corresponding tether so as to secure a first fiber optic cable to the first tether attachment point and a second fiber optic cable to the second tether attachment point.

10. The bracket of claim 9, wherein the first planar portion is substantially perpendicular to the second planar portion, and wherein the third planar portion is substantially perpendicular to the second planar portion and substantially parallel to the first planar portion.

11. The bracket of claim 10, wherein the fastener perforations form a triangle in the first planar portion such that a first fastener perforation is spaced closer to the first tether attachment point than to the second and third fastener perforations, and wherein the fourth recessed edge overlaps with the first fastener perforation in a direction perpendicular to the first planar portion.

12. An assembly for securing multiple fiber optic cables to a fiber optic termination box, the assembly comprising:
a multi-cable retention bracket, comprising:
a first substantially planar portion comprising one or more fastener perforations dimensioned to receive a fastener for affixing the bracket to the fiber optic termination box;
a second substantially planar portion forming a first corner with the first substantially planar portion;
a third substantially planar portion forming a second corner with the second substantially planar portion, the third planar portion being spaced apart from the first substantially planar portion;
a protrusion of the first and second planar portions at the first corner;
a notch in the second planar portion between the first and second corners;
a first tether attachment point comprising first and second recessed edges of the first and second planar portions, respectively, the first and second recessed edges each being spaced apart from the first corner along the protrusion and together being configured to receive a first tether wrapped around the first corner so as to secure a first fiber optic cable to the bracket; and
a second tether attachment point comprising a third recessed edge in the notch and fourth recessed edge of the third planar portion, the third and fourth recessed edges each being spaced apart from the second corner and together being configured to receive a second tether wrapped around the second corner so as to secure a second fiber optic cable to the bracket; and
first and second fiber optic cables secured to the multi-cable retention bracket, wherein the first fiber optic cable is secured to the first tether attachment point by a first tether arranged in the first and second recessed edges and wrapped around the first corner, and wherein the second fiber optic cable is secured to the second tether attachment point by a second tether arranged in third and fourth recessed edges and wrapped around the second corner.

13. The assembly of claim 12, wherein the first and second tethers are hose clamps, and wherein a distance between the sidewalk of the first, second, third and fourth recessed edges corresponds to a thickness of the hose clamps.

14. The assembly of claim 12, further comprising:
a fiber optic termination box comprising a substantially planar bracket mounting location, the bracket mounting location comprising one or more fastener perforations,
wherein the multi-cable retention bracket is secured to the mounting location by a plurality of fasteners extending through the fastener perforations of the multi-cable retention bracket and the fiber optic termination box.

15. The assembly of claim 14, wherein the first planar portion comprises a first fastener perforation with a beveled edge, and wherein a fastener in the first fastener perforation is completely arranged beneath the first planar portion.

* * * * *